United States Patent
Dey et al.

(10) Patent No.: US 12,373,199 B2
(45) Date of Patent: Jul. 29, 2025

(54) ASSISTING PROGRAM CODE DEVELOPMENT BY PROCESSING MULTIMODAL DATA OF A MEETING

(71) Applicant: Accenture Global Solutions Limited, Dublin (IE)

(72) Inventors: Kuntal Dey, Rampurhat (IN); Kapil Singi, Bangalore (IN); Vibhu Saujanya Sharma, Bangalore (IN); Vikrant Kaulgud, Pune (IN); Adam Patten Burden, Tampa, FL (US)

(73) Assignee: Accenture Global Solutions Limited, Dublin (IE)

( * ) Notice: Subject to any disclaimer, the term of this patent is extended or adjusted under 35 U.S.C. 154(b) by 156 days.

(21) Appl. No.: 18/144,487

(22) Filed: May 8, 2023

(65) Prior Publication Data
US 2024/0378051 A1    Nov. 14, 2024

(51) Int. Cl.
*G06F 8/73*     (2018.01)
*H04L 12/18*    (2006.01)

(52) U.S. Cl.
CPC ............ *G06F 8/73* (2013.01); *H04L 12/1831* (2013.01)

(58) Field of Classification Search
None
See application file for complete search history.

(56) References Cited

U.S. PATENT DOCUMENTS

| | | | |
|---|---|---|---|
| 5,261,100 A * | 11/1993 | Fujinami | G06F 8/36 717/122 |
| 5,317,683 A | 5/1994 | Hager et al. | |
| 6,754,631 B1 | 6/2004 | Din | |
| 7,974,871 B2 | 7/2011 | Oral et al. | |
| 8,214,242 B2 | 7/2012 | Agapi et al. | |
| 9,165,290 B2 | 10/2015 | Wessling et al. | |
| 9,734,208 B1 | 8/2017 | Goldstein et al. | |
| 2006/0224430 A1 | 10/2006 | Butt | |
| 2009/0119246 A1 | 5/2009 | Kansal | |
| 2011/0271246 A1 * | 11/2011 | Fujihara | G06F 8/74 717/104 |
| 2013/0325972 A1 | 12/2013 | Boston et al. | |
| 2014/0278377 A1 | 9/2014 | Peters et al. | |
| 2016/0117624 A1 | 4/2016 | Flores et al. | |
| 2019/0317743 A1 * | 10/2019 | Cremeans | G06N 20/00 |
| 2021/0192321 A1 * | 6/2021 | Zhang | G06F 8/427 |
| 2021/0240453 A1 * | 8/2021 | Badlani | G06F 8/42 |
| 2022/0012018 A1 * | 1/2022 | Trim | G06N 20/00 |

* cited by examiner

*Primary Examiner* — Qing Chen
(74) *Attorney, Agent, or Firm* — Polsinelli PC (57) ABSTRACT

A method and system for assisting program code development are disclosed. The method may include obtaining multimodal data of a meeting discussing a program code development, extracting a plurality of topics and a plurality of concepts from the multimodal data, identifying a plurality of meeting segments for the plurality of concepts. The method may further include determining a coding intent from program codes for the program code development, aligning the coding intent to a set of topics, identifying the set of concepts associated with the topic aligned with the coding intent, identifying a set of meeting segments associated with the concept. The method may further include determining an alignment metric of the meeting segment based on an alignment metric between the coding intent and the topic, and outputting one or more meeting segments for the coding intent based on alignment metrics of the one or more meeting segments.

20 Claims, 3 Drawing Sheets

ASSISTING PROGRAM CODE DEVELOPMENT BY PROCESSING MULTIMODAL DATA OF A MEETING

TECHNICAL FIELD

This disclosure relates to natural language processing, in particular, to assisting program code development by processing multimodal data of a meeting discussing the program code development.

BACKGROUND

In software development, information technology (IT) services delivery and IT/software solutioning centers, meetings often happen on weekly, sub-weekly, daily or sub-daily basis, and attendees tend to keep recordings and manual notes. The existing solutions enable summarizing meetings and extracting topics and keywords from these meetings, but failing to translate the meeting into anything actionable or meaningfully make use of the topics and keywords based upon any requirement that arise from software design, development, quality assurance (QA), and delivery progress.

SUMMARY

This disclosure relates to systems and methods for assisting program code development by processing multimodal data of a meeting discussing the program code development.

In one embodiment, a method for assisting program code development is disclosed. The method may include obtaining multimodal data of a meeting discussing a program code development and extracting a plurality of topics and a plurality of concepts from the multimodal data. A concept may represent an object or an action relevant to a topic discussed the meeting. A topic may be associated with a set of concepts and a concept may be associated with a set of topics. The method may further include identifying a plurality of meeting segments for the plurality of concepts. A meeting segment may represent a segment of the multimodal data over a time period during the meeting and a concept may occur in the set of meeting segments. A concept may be associated with a set of meeting segments, and a meeting segment being may be associated with a set of concepts.

The method may further include determining a coding intent from program codes for the program code development and aligning the coding intent to a set of topics. The method may further include, for each of the set of topics, identifying the set of concepts associated with the topic aligned with the coding intent; for each of the set of concepts, identifying a set of meeting segments associated with the concept; and for each of the set of meeting segments, determining an alignment metric of the meeting segment based on an alignment metric between the coding intent and the topic, an alignment metric between the topic and the concept, and an association weight between the concept and the meeting segment. The method may further include outputting one or more meeting segments for the coding intent based on alignment metrics of the one or more meeting segments.

In another embodiment, a system for assisting program code development is disclosed. The system may include a memory having stored thereon executable instructions and a processor circuitry in communication with the memory. When executing the instructions, the processor circuitry may be configured to obtain multimodal data of a meeting discussing a program code development and extract a plurality of topics and a plurality of concepts from the multimodal data. A concept may represent an object or an action relevant to a topic discussed the meeting. A topic may be associated with a set of concepts and a concept may be associated with a set of topics. The processor circuitry may be further configured to identify a plurality of meeting segments for the plurality of concepts. A meeting segment may represent a segment of the multimodal data over a time period during the meeting and a concept may occur in the set of meeting segments. A concept may be associated with a set of meeting segments, and a meeting segment being may be associated with a set of concepts.

The processor circuitry may be further configured to determine a coding intent from program codes for the program code development and align the coding intent to a set of topics. The processor circuitry may be further configured to, for each of the set of topics, identify the set of concepts associated with the topic aligned with the coding intent; for each of the set of concepts, identify a set of meeting segments associated with the concept; and for each of the set of meeting segments, determine an alignment metric of the meeting segment based on an alignment metric between the coding intent and the topic, an alignment metric between the topic and the concept, and an association weight between the concept and the meeting segment. The processor circuitry may be further configured to output one or more meeting segments for the coding intent based on alignment metrics of the one or more meeting segments.

In another embodiment, a product for assisting program code development is disclosed. The product may include non-transitory machine-readable media and instructions stored on the machine-readable media. When being executed, the instructions may be configured to cause a processor circuitry to obtain multimodal data of a meeting discussing a program code development and extract a plurality of topics and a plurality of concepts from the multimodal data. A concept may represent an object or an action relevant to a topic discussed the meeting. A topic may be associated with a set of concepts and a concept may be associated with a set of topics. The instructions may be further configured to cause the processor circuitry to identify a plurality of meeting segments for the plurality of concepts. A meeting segment may represent a segment of the multimodal data over a time period during the meeting and a concept may occur in the set of meeting segments. A concept may be associated with a set of meeting segments, and a meeting segment being may be associated with a set of concepts.

The instructions may be further configured to cause the processor circuitry to determine a coding intent from program codes for the program code development and align the coding intent to a set of topics. The instructions may be further configured to cause the processor circuitry to, for each of the set of topics, identify the set of concepts associated with the topic aligned with the coding intent; for each of the set of concepts, identify a set of meeting segments associated with the concept; and for each of the set of meeting segments, determine an alignment metric of the meeting segment based on an alignment metric between the coding intent and the topic, an alignment metric between the topic and the concept, and an association weight between the concept and the meeting segment. The instructions may be further configured to cause the processor circuitry to output one or more meeting segments for the coding intent based on alignment metrics of the one or more meeting segments.

The above embodiments and other aspects and alternatives of their implementations are explained in greater detail in the drawings, the descriptions, and the claims.

BRIEF DESCRIPTION OF THE DRAWINGS

The present disclosure may be better understood with reference to the following drawings and description. The components in the figures are not necessarily to scale. Moreover, in the figures, like-referenced numerals designate corresponding parts throughout the different views.

DETAILED DESCRIPTION

The disclosure will now be described in detail hereinafter with reference to the accompanied drawings, which form a part of the present disclosure, and which show, by way of illustration, specific examples of embodiments. Please note that the disclosure may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, firmware or any combination thereof.

Throughout the specification and claims, terms may have nuanced meanings suggested or implied in context beyond an explicitly stated meaning. Likewise, the phrase "in an embodiment" or "in an implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

The systems and methods in the present disclosure may facilitate to the program code development by contextually prioritizing keywords and topics extracted from the multimodal data of the meeting discussing the program code development and automatically establish connections between meeting segments of the meeting and program code segments being developed by one or more developers. The connections may help the developer on program code assimilation and generation. Here, the multimodal data of the meeting may include one, two or more modes of data from the meeting. For example, multimodal data may include meeting audio data, video data, chat records, and documents discussed in the meeting.

Figure 1:
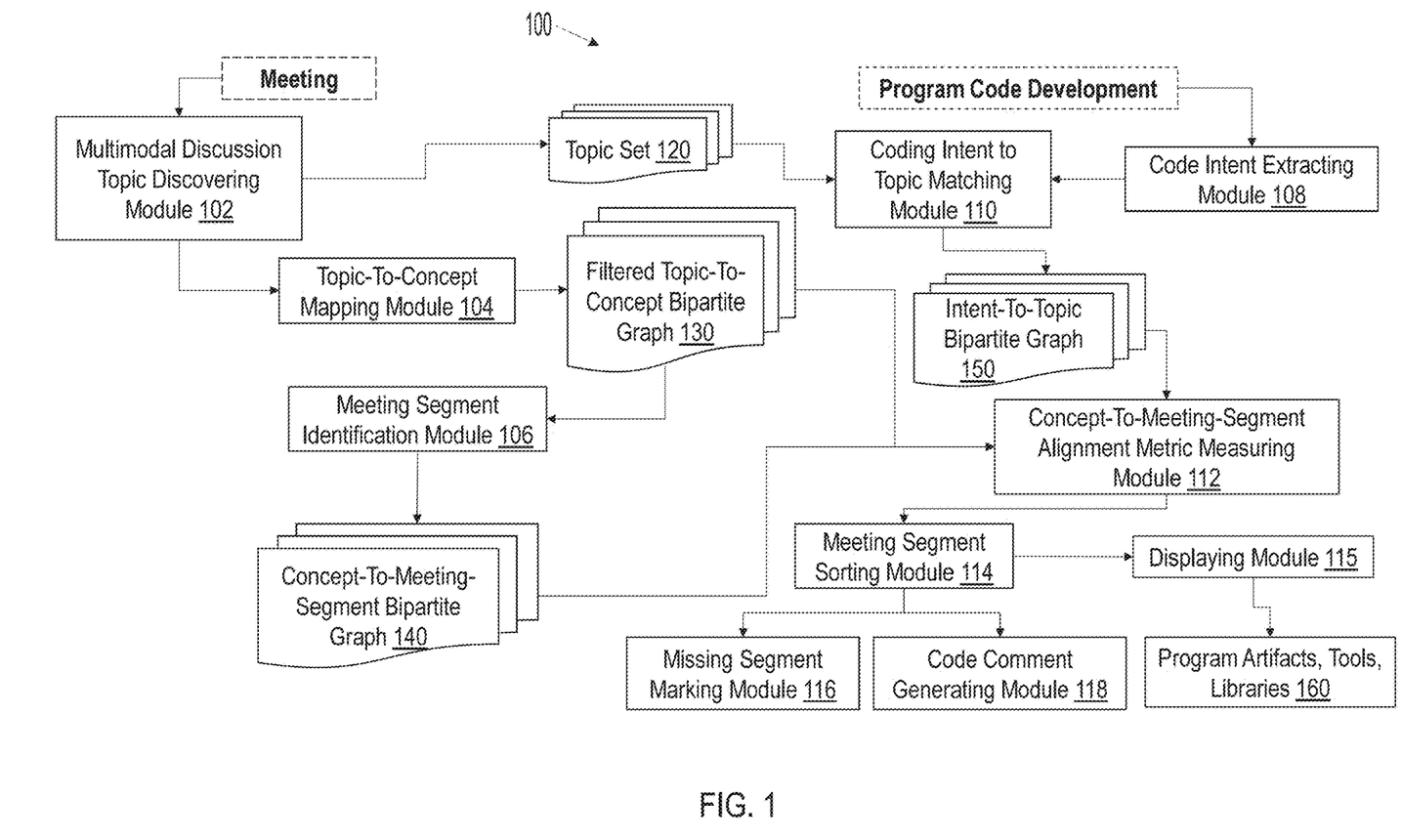
FIG. 1 shows an exemplary architecture for assisting program code development.

FIG. 1 shows exemplary architecture 100 for assisting program code development. The architecture 100 may include multimodal discussion topic discovering module 102, topic-to-concept mapping module 104, meeting segment identification module 106, code intent extracting module 108, coding intent to topic matching module 110, concept-to-meeting-segment alignment metric measuring module 112, meeting segment sorting module 114, displaying module 115, missing segment marking module 116, and code comment generating module 118. The modules may operate collaboratively to assist program code development as discussed in the present disclosure. The functions of the modules will be described by exemplary embodiments below. It should be appreciated that one or more modules may be removed from the exemplary architecture 100 or one or more other modules may be integrated into the exemplary architecture 100 to implement the technical solutions discussed in the present disclosure.

Herein, the term module may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the unit. A module is configured to perform functions and achieve goals such as those described in this disclosure, and may work together with other related modules, programs, and components to achieve those functions and goals.

Figure 2:
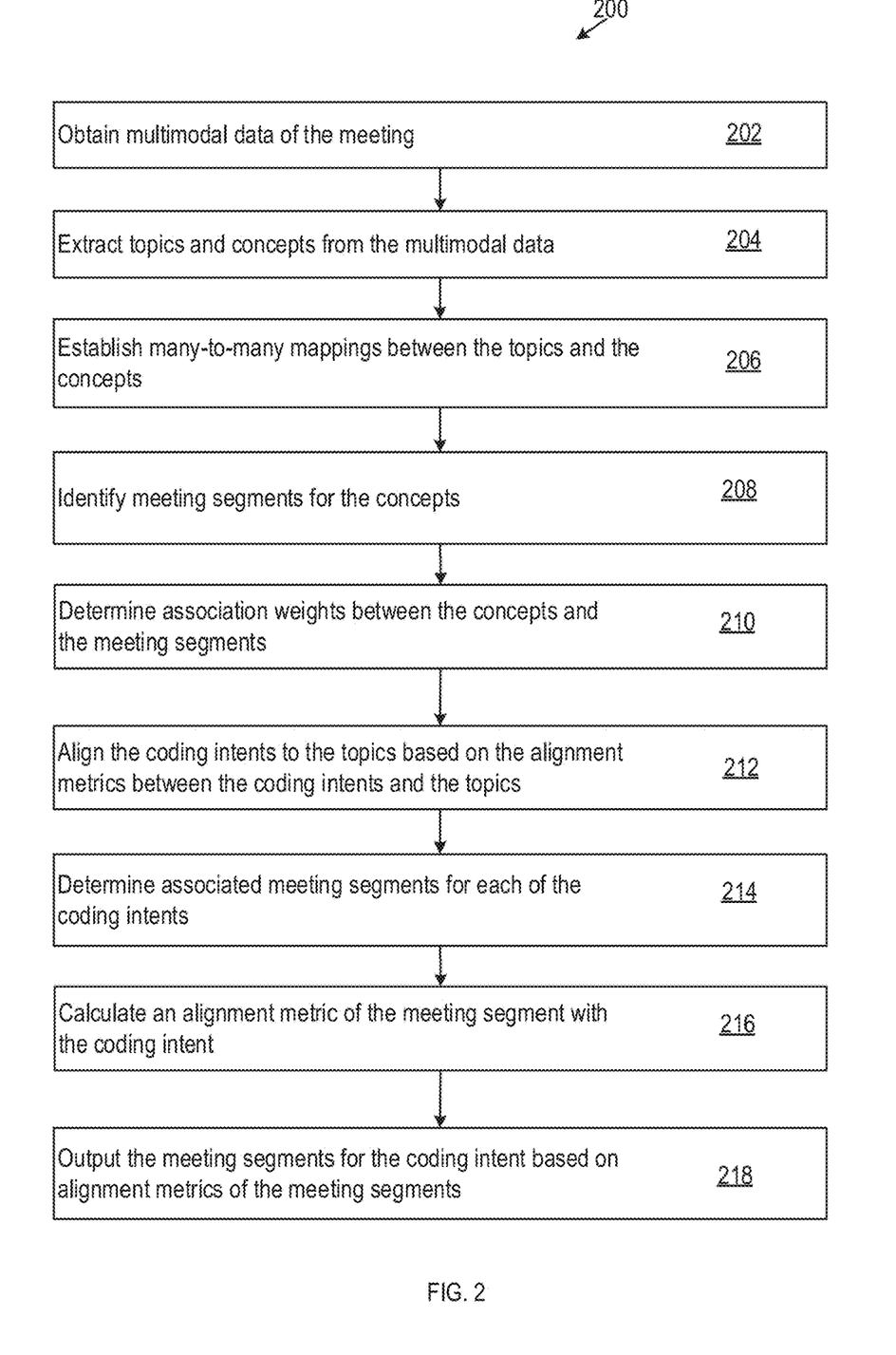
FIG. 2 shows an exemplary software development meeting analytics logic for assisting program code development.

FIG. 2 shows an exemplary software development meeting analytics logic (SDMAL) 200 for assisting program code development. The logical features in the SDMAL 200 will be discussed with reference to FIG. 1 and FIG. 2.

At the multimodal discussion topic discovering module 102, the SDMAL 200 may obtain multimodal data of the meeting discussing the program code development (202). In an example, the SDMAL 200 may make use of the multimedia devices to record the meeting to obtain the audio and video streams of the meeting in real time. In another example, the SDMAL 200 may retrieve the multimodal data of the meeting from a data storage maintaining records and contents of past meetings. The data storage may be, for example, a local relational database or a cloud storage.

After obtaining the multimodal data, the SDMAL 200 may extract a plurality of topics 120 and a plurality of concepts from the multimodal data (204). A concept may represent an object or an action relevant to a topic discussed the meeting. A topic may be associated with a set of concepts and a concept may associated with a set of topics. The topics and the concepts are many-to-many relationship. In an example, the multimodal data includes audio data. The SDMAL 200 may make use of a speech-to-text tool to convert the audio data into the textual data, and then perform natural language processing (NLP) on the textual data to extract the plurality of topics and concepts from the textual data. The SDMAL 200 may make use of applicable NLP techniques, such as latent dirichlet allocation (LDA) and word-embedding-distance-based clustering, to extract the topics and the concepts. The LDA is a generative probabilistic model for collections of discrete textual data, in which each concept of a collection is modeled as a finite mixture over an underlying set of topics. Each topic is, in turn, modeled as an infinite mixture over an underlying set of topic probabilities. In the context of text modeling, the topic probabilities provide an explicit representation of a document.

At the topic-to-concept mapping module 104, the SDMAL 200 may establish the many-to-many mappings between the topics and the concepts, for example, using the association information between the topics and the concepts generated by the LDA model (206). In an example, the mappings between the topics and the concepts may be represented as a many-to-many probabilistic bipartite graph.

In some implementations, the SDMAL may further process the mappings between the topics and the concepts to create a filtered topic-to-concept bipartite graph 130, in which topics are set at one side of the graph and concepts are set at the other side of the graph. Where the probability that a concept belongs to a topic is higher than a predetermined probability threshold, the SDMAL 200 may generate an edge between the concept and the topic in the filtered topic-to-concept bipartite graph 130. The SDMAL 200 may determine the probability that the concept belongs to the topic as an edge weight of the edge connecting the topic to the concept.

In an implementation, the SDMAL 200 may calculate the relevance probabilities between the topics and the concepts based on the weights of edges between the topics and the concepts in the filtered topic-to-concept bipartite graph 130. Then, the SDMAL 200 may use the relevance probabilities as the alignment metrics between the topics and the concepts. The alignment metric may represent a closeness of a concept to a topic in comparison with other topics.

At the meeting segment identification module 106, the SDMAL 200 may identify a plurality of meeting segments for the plurality of concepts in the filtered topic-to-concept bipartite graph 130 (208). A meeting segment may represent a segment of the multimodal data over a time period during the meeting. As a concept may occur in the set of meeting segments and a meeting segment may include a set of concepts, a concept may be associated with a set of meeting segments, and a meeting segment may be associated with a set of concepts.

In an implementation, the SDMAL 200 may identify a first time point $t_1$ and a second time point $t_2$ at both of which a concept occurs in the meeting. The second time point $t_2$ is later than the first time point $t_1$. Where a time difference between the first time point $t_1$ and the second time point $t_2$ is less than a predetermined time difference threshold th, the SDMAL 200 may determine the meeting segment between $t_1$ and $t_2$ as a candidate meeting segment for the concept. Then, the SDMAL 200 may identify a next time point, i.e., the third time point $t_3$ later than $t_2$, when the same concept occurs in the meeting. Where the time difference between the third time point $t_3$ and the second time point $t_2$ is equal to or greater than the predetermined time difference threshold th, the SDMAL 200 may determine the candidate meeting segment between $t_1$ and $t_2$ to be a meeting segment associated with the concept.

Alternatively, where the time difference between the third time point $t_3$ and the second time point $t_2$ is less than the time difference threshold, the SDMAL 200 may update the candidate meeting segment to span from $t_1$ to $t_3$. The SDMAL 200 may keep identifying a next time point when the same concept occurs until a time point $t_n$ such that $|t_n - t_{n-1}| \geq th$. As a result, the SDMAL 200 may determine the candidate meeting segment spanning from $t_1$ to $t_{n-1}$ as a meeting segment associated with the concept.

Further, the SDMAL 200 may determine the association weight between the concept and the meeting segment associated with the concept, for example, based on the timespan of the meeting segment and the number of times that the concept occurs in the meeting segment (210). The association weight may have a positive correlation with the timespan of the meeting segment and the number of times for the occurrence of the concept. Where the timespan of the meeting segment is longer or the number of times that the concept occurs in the meeting segment is higher, the association weight between the concept and the meeting segment may be higher. In this way, the SDMAL 200 may create concept-to-meeting-segment weighted association which may be represented as a many-to-many probabilistic bipartite graph between the concepts and the meeting segments, i.e., the concept-to-meeting-segment bipartite graph 140.

At the code intent extracting module 108, the SDMAL 200 may determine coding intents from program codes that the developers are developing (212). In an example, the program codes may include a plurality of code modules being developed by different developers in parallel. The code modules are intended to implement different functions. The coding intents may represent the different functions. The SDMAL 200 may derive the coding intents from names of the code modules or the code files containing the code modules, for example, using existing NLP techniques such as Bidirectional Encoder Representations from Transformer (BERT) and Generative Pre-trained Transformer (GPT).

At the coding intent to topic matching module 110, the SDMAL 200 may determine similarities between the coding intents and the topics 120 extracted from the multimodal data of the meeting and use the similarities as the alignment metrics between the coding intents and the topics. In an implementation, the SDMAL 200 may make use of a NPL model to perform semantics analysis on a coding intent and a topic to generate word embeddings for the code intent and the topic, determine the similarity between the word embeddings of the coding intent and the word embeddings of the topic as the similarity between the code intent and the topic. The similarity between the coding intent and the topic may be represented as the alignment metric between the coding intent and the topic. Additionally, or alternatively, the SDMAL 200 may make use of LDA or probabilistic latent semantic analysis (PLSA) to evaluate the association probability between a coding intent and a topic and represent the alignment metric between the coding intent and the topic with the association probability.

Then, the SDMAL 200 may align each of the coding intent to one or more topics to generate association between the coding intent and the topics based on the alignment metrics between the coding intent and the topics (214). In an implementation, the SDMAL 200 may generate the association coding intents and topics as an intent-to-topic bipartite graph 150 with the coding intents being at one side of the bipartite graph 150 and the topics being at the other side of the bipartite graph 150. Where there is an alignment metric between a coding intent and a topic, the SDMAL 200 may generate an edge between the coding intent and the topic in the bipartite graph 150 and assign the alignment metric as the edge weight of the edge.

At the concept-to-meeting-segment alignment metric measuring module 112, the SDMAL 200 may determine one or more associated meeting segments for each of the coding intents (214). For each of the coding intents, the SDMAL 200 may identify a set of topics with intent-to-topic edge weights higher than a weight threshold from the intent-to-topic bipartite graph 150. For each of the identified topics, the SDMAL 200 may identify a set of concepts associated with the topic from the filtered topic-to concept bipartite graph 130. For each of the identified concepts, the SDMAL 200 may identify a set of meeting segments associated with the concept from the concept-to-meeting-segment bipartite graph 140.

Then, for each of the identified meeting segments, the SDMAL 200 may calculate an alignment metric of the meeting segment with the coding intent based on the alignment metric between the coding intent and the topic obtained at the coding intent to topic matching module 110, an alignment metric between the topic and the concept obtained the topic-to-concept mapping module 104, and an association weight between the concept and the meeting segment obtained at the meeting segment identification module 106 (216). Here, the alignment metric of the meeting segment may have a positive correlation with the alignment metric between the coding intent and the topic, the alignment metric between the topic and the concept, and an association weight between the concept and the meeting segment.

At the meeting segment sorting module 114, the SDMAL 200 may filter the identified meeting segments for a coding intent to only retain the meeting segments whose alignment metrics are greater than a predetermined alignment threshold. At the displaying module 115, the SDMAL 200 may output the retained meeting segments for the coding intent based on alignment metrics of the retained meeting segments (218). For example, the SDMAL 200 may display the retained meeting segments in descending order of the alignment metrics of the retained meeting segments via a graphical user interface (GUI). The retained meeting segments may be displayed to the developer who is developing the code module corresponding to the coding intent. The meeting segments may be displayed in different forms as appropriate. For example, the SDMAL 200 may display the meeting segments as text recognized from the audio data of the meeting segments, text in the chat records of the meeting segments, links to the audio data and video data of the meeting segments, or links to the documents discussed in the meeting segments. Additionally, or alternatively, the retained meeting segments may be displayed to a code reviewer who is reviewing the code module corresponding to the code intent. In this way, the developer and the code reviewer may readily recall or be aware of what have been discussed in the meeting with respect to this code module to facilitate the program code development. In an example, the developer may refer to the meeting segments to write program codes, draw hints, and invoke online code generators or code libraries 160 discussed in the meeting.

At the code comment generating module 118, the SDMAL 200 may generate coding comments for the code module based on the meeting segments displayed for the code module. In an example, the SDMAL 200 may make use of applicable NLP techniques such as BertSum and GPT-4 to extract summary from the textual data of the meeting segments and use the extracted summary as the coding comments for the code module.

At the missing segment marking module 116, the SDMAL 200 may mark the displayed meeting segments as having been outputted for the coding intent. In this way, all the meeting segments associated with the coding intents that have been implemented can be marked, and the SDMAL 200 may facilitate to determine the progress of the program code development based on unmarked meeting segments which may indicate topics that have not been implemented.

In some implementations, the SDMAL 200 may be triggered to identify the unmarked meeting segments when a meeting segment is marked or the program codes development task is marked as complete. The SDMAL may maintain a global records of meeting segment identifiers and the meeting segment identifiers for unmarked meeting segments may be returned and noted as process exceptions, which may indicate that a topic has been discussed in the meeting sufficiently, for example, over a predetermined discussion threshold in the meeting, but not covered by the developed program codes.

Here, a working example utilizing the systems and methods for assisting program code development is provided. In a meeting, a discussion is being carried out around developing a cloud continuum monitoring digital twin and testing whether the twin can detect load balancer issues. The attendees of the meeting include Kapil, Kuntal, Swapnajeet, Manish, Kanchan and Kaushik. Swapnajeet is a cloud continuum subject matter expert with a span of end-to-end knowledge. Kanchan is a specialist on digital twin creation. Manish is an expert in creating and testing monitoring frameworks. Kaushik is an expert of load balancers.

The meeting has been back and forth over related topics. The SDMAL 200 obtains the audio stream of the meeting in real time and extract topics from the audio data in the audio stream. Once the meeting gets over as indicated by an external input, the SDMAL 200 may determine the discussed topics as (a) cloud continuum monitoring, (b) digital twin, (c) testing and (d) load balancers, and obtain the filtered topic-to-concept bipartite graph and the concept-to-meeting-segment bipartite graph as discussed above.

After the meeting, Swapnajeet, Kaushik, Manish and Kanchan open a shared codebase on which they start to programming for the development project discussed in the meeting. Kanchan writes a program code for creating the digital twin, Manish programs on a monitoring framework, and Kaushik writes a load-balancer program.

For Kanchan, the first code module she programs has a function name "create_digital_twin(parameters)."—The SDMAL 200 identifies a coding intent from this code module, aligns the coding intent with the topic of creating digital twins, identifies the concepts associated with the topic from the filtered topic-to-concept bipartite graph, and identifies the meeting segments associated with the concepts from the concept-to-meeting-segment graph. Then, the SDMAL 200 calculates alignment metric of the identified meeting segment and displays the meeting segments to Kanchan such that the meeting segment with the highest alignment metric is shown on the top.

For Manish, as he has been programming his code module with the function name "instantiate_monitoring_agent(parameters)", the SDMAL 200 identifies a coding intent from this code module, and aligns the coding intent with the topic of cloud continuum monitoring. With the similar process, the SDMAL 200 identifies the associated concepts with respect to monitoring agents and frameworks and displays the meeting segments associated with the concepts to Manish.

Then, Swapnajeet logs in for code review when Kanchan and Manish have completed their coding tasks and Kaushik has completed 3 out of his 5 code modules. To facilitate the code review, the SDMAL 200 may display the unmarked meeting segments directed to the topic of load balancer and identify Kaushik as the developer working on this topic.

Figure 3:
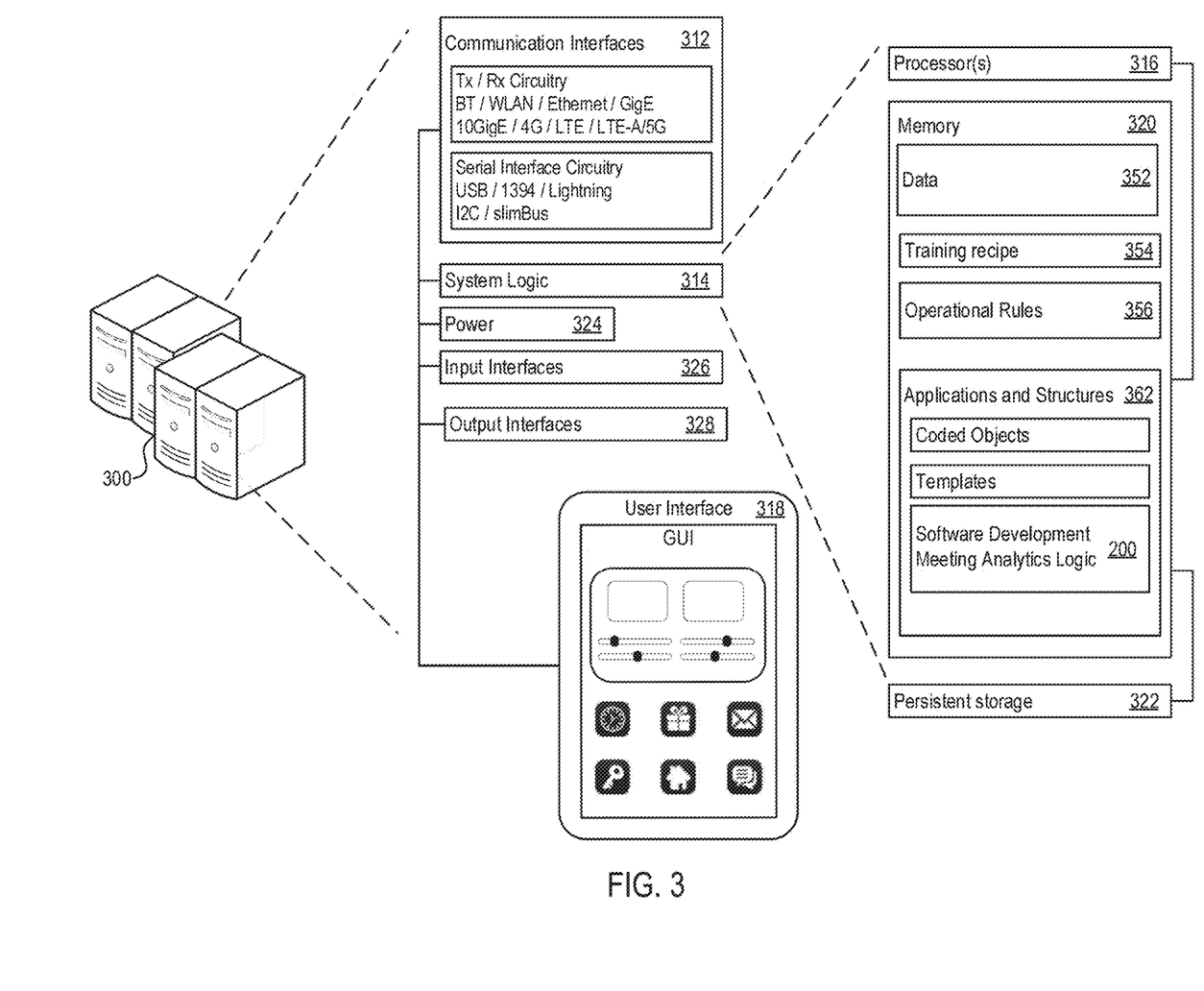
FIG. 3 shows an exemplary specific execution environment for executing the software development meeting analytics logic for assisting program code development.

FIG. 3 shows an exemplary specific execution environment for executing the software development meeting analytics logic 200 as described above. The execution environment 300 may include system logic 314 to support execution of the logics described above. The system logic 312 may include processors 316, memory 320, and/or other circuitries. The memory 320 may include global federated learning model 352, training recipe 354, and operational rules 356. The memory 520 may further include applications and structures 662, for example, coded objects, machine instructions, templates, or other structures to support extracting topics and concepts from the multimodal data, identifying meeting segments for the concepts, determining a coding intent from program codes, determining alignment metrics of the meeting segments, or other tasks described above. The applications and structures may implement the software development meeting analytics logic 200.

The execution environment 300 may also include communication interfaces 312, which may support wireless, e.g. Bluetooth, Wi-Fi, WLAN, cellular (4G, LTE/A, 5G), and/or wired, Ethernet, Gigabit Ethernet, optical networking protocols. The communication interfaces 312 may also include serial interfaces, such as universal serial bus (USB), serial ATA, IEEE 1394, lighting port, I$^2$C, slimBus, or other serial interfaces. The execution environment 300 may include power functions 324 and various input interfaces 326. The execution environment may also include a user interface 318 that may include human-to-machine interface devices and/or graphical user interfaces (GUI). In some implementations, the system logic 314 may be distributed over one or more physical machines or be implemented as one or more virtual machines.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CD-ROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

What is claimed is:

1. A method for assisting program code development, the method comprising:
    obtaining, with a processor circuitry, multimodal data of a meeting discussing a program code development, wherein the obtaining the multimodal data of the meeting comprises:
        recording the meeting to obtain audio data and video streams of the meeting in real time from multi-media devices, and
        retrieving the multimodal data of the meeting from a cloud storage maintaining records and contents of past meetings;
    extracting, with the processor circuitry, a plurality of topics and a plurality of concepts from the multimodal data of the meeting, wherein a concept represents an object or an action relevant to a topic discussed during the meeting, wherein a topic is associated with a set of concepts and a concept is associated with a set of topics, and wherein the extracting the plurality of topics and the plurality of concepts comprises:
        converting, using a speech-to-text tool, the audio data of the meeting into textual data of the meeting, and
        performing natural language processing (NLP) on the textual data of the meeting to extract the plurality of topics and the plurality of concepts from the textual data of the meeting;
    identifying, with the processor circuitry, a plurality of meeting segments for the plurality of concepts, wherein a meeting segment represents a segment of the multimodal data of the meeting over a time period during the meeting and a concept occurring in a set of meeting segments, wherein a concept is associated with the set of meeting segments, and wherein a meeting segment being is associated with the set of concepts;
    determining, with the processor circuitry, a coding intent from program codes for the program code development;
    aligning, with the processor circuitry, the coding intent to a set of topics;
    for a topic of the set of topics, identifying, with the processor circuitry using a filtered topic-to-concept bipartite graph, the set of concepts associated with the topic aligned with the coding intent, wherein the filtered topic-to-concept bipartite graph is generated by:
  mappings using association information between the plurality of topics and the plurality of concepts, and
  processing the mappings between the plurality of topics and the plurality of concepts to generate the filtered topic-to-concept bipartite graph;
for a concept of the set of concepts, identifying, with the processor circuitry using a concept-to-meeting-segment bipartite graph, the set of meeting segments associated with the concept, wherein the concept-to-meeting-segment bipartite graph is generated by:
  determining an association weight between the concept and the meeting segment associated with the concept, and
  creating a concept-to-meeting-segment weighted association which represents the concept-to-meeting-segment bipartite graph between the set of concepts and the set of meeting segments;
for a meeting segment of the set of meeting segments, determining, with the processor circuitry, an alignment metric of the meeting segment based on an alignment metric between the coding intent and the topic, an alignment metric between the topic and the concept, and the association weight between the concept and the meeting segment associated with the concept; and
outputting, with the processor circuitry via a graphical user interface (GUI), one or more meeting segments for the coding intent based on alignment metrics of the one or more meeting segments for the coding intent to a developer who is developing the program codes corresponding to the coding intent in order to facilitate the program code development.

2. The method of claim 1, wherein the method further comprises:
  determining the association weight between the concept and the meeting segment associated with the concept based on a time duration of the meeting segment and a number of times that the concept occurs in the meeting segment.

3. The method of claim 1, wherein the method further comprises:
  determining a relevance probability between the topic and the concept based on the multimodal data of the meeting; and
  using the relevance probability as the alignment metric between the topic and the concept.

4. The method of claim 1, wherein the method further comprises:
  determining a similarity between the coding intent and the topic; and
  using the similarity as the alignment metric between the coding intent and the topic.

5. The method of claim 1, wherein the identifying the plurality of meeting segments for the plurality of concepts comprises:
  identifying a first time point and a second time point when a concept occurs in the meeting, wherein the second time point is later than the first time point, and wherein a time difference between the first time point and the second time point is less than a predetermined time difference threshold;
  identifying a third time point when the concept occurs in the meeting, wherein the third time point is later than the second time point; and
  in response to a time difference between the third time point and the second time point being equal to or greater than the predetermined time difference threshold, determining a meeting segment between the first time point and the second time point to be associated with the concept.

6. The method of claim 5, wherein the identifying the plurality of meeting segments for the plurality of concepts comprises:
  in response to the time difference between the third time point and the second time point being less than the predetermined time difference threshold, determining a meeting segment between the first time point and the third time point to be associated with the concept.

7. The method of claim 1, wherein performing the natural language processing (NLP) on the textual data of the meeting comprises:
  using any one of NLP techniques including latent dirichlet allocation (LDA) and word-embedding-distance-based clustering, to extract the plurality of topics and the plurality of concepts from the textual data of the meeting.

8. The method of claim 1, wherein the method further comprises:
  generating coding comments for the program codes based on the one or more meeting segments.

9. The method of claim 1, wherein the outputting the one or more meeting segments for the coding intent comprises:
  displaying the one or more meeting segments whose alignment metrics are greater than an alignment threshold.

10. The method of claim 1, wherein the outputting the one or more meeting segments for the coding intent comprises:
  displaying the one or more meeting segments in descending order of the alignment metrics of the one or more meeting segments.

11. The method of claim 1, wherein the method further comprises:
  marking the one or more meeting segments as having been outputted for the coding intent; and
  in response to a request for reviewing a progress of the program code development, outputting unmarked meeting segments to assist the review.

12. A system for assisting program code development, the system comprising:
  a memory having stored thereon executable instructions; and
  a processor circuitry in communication with the memory, the processor circuitry, when executing the executable instructions, configured to:
  obtain multimodal data of a meeting discussing a program code development, wherein the obtaining the multimodal data of the meeting comprises:
    recording the meeting to obtain audio data and video streams of the meeting in real time from multi-media devices, and
    retrieving the multimodal data of the meeting from a cloud storage maintaining records and contents of past meetings;
  extract a plurality of topics and a plurality of concepts from the multimodal data of the meeting, wherein a concept represents an object or an action relevant to a topic discussed during the meeting, wherein a topic is associated with a set of concepts and a concept is associated with a set of topics, and wherein the extracting the plurality of topics and the plurality of concepts comprises:

converting, using a speech-to-text tool, the audio data of the meeting into textual data of the meeting, and performing natural language processing (NLP) on the textual data of the meeting to extract the plurality of topics and the plurality of concepts from the textual data of the meeting;

identify a plurality of meeting segments for the plurality of concepts, wherein a meeting segment represents a segment of the multimodal data of the meeting over a time period during the meeting and a concept occurring in a set of meeting segments, wherein a concept is associated with the set of meeting segments, and wherein a meeting segment is associated with the set of concepts;

determine a coding intent from program codes for the program code development;

align the coding intent to a set of topics;

for a topic of the set of topics, identify, using a filtered topic-to-concept bipartite graph, the set of concepts associated with the topic aligned with the coding intent, wherein the filtered topic-to-concept bipartite graph is generated by:
mappings using association information between the plurality of topics and the plurality of concepts, and
processing the mappings between the plurality of topics and the plurality of concepts to generate the filtered topic-to-concept bipartite graph;

for a concept of the set of concepts, identify, using a concept-to-meeting-segment bipartite graph, the set of meeting segments associated with the concept, wherein the concept-to-meeting-segment bipartite graph is generated by:
determining an association weight between the concept and the meeting segment associated with the concept, and
creating a concept-to-meeting-segment weighted association which represents the concept-to-meeting-segment bipartite graph between the set of concepts and the set of meeting segments;

for a meeting segment of the set of meeting segments, determine an alignment metric of the meeting segment based on an alignment metric between the coding intent and the topic, an alignment metric between the topic and the concept, and the association weight between the concept and the meeting segment associated with the concept; and output, via a graphical user interface (GUI), one or more meeting segments for the coding intent based on alignment metrics of the one or more meeting segments for the coding intent to a developer who is developing the program codes corresponding to the coding intent in order to facilitate the program code development.

13. The system of claim 12, wherein the processor circuitry is further configured to:
determine the association weight between the concept and the meeting segment based on a time duration of the meeting segment and a number of times that the concept occurs in the meeting segment.

14. The system of claim 12, wherein the processor circuitry is further configured to:
determine a relevance probability between the topic and the concept based on the multimodal data of the meeting; and
use the relevance probability as the alignment metric between the topic and the concept.

15. The system of claim 12, wherein the processor circuitry is further configured to:

determine a similarity between the coding intent and the topic; and
use the similarity as the alignment metric between the coding intent and the topic.

16. The system of claim 12, wherein the processor circuitry is further configured to:
identify a first time point and a second time point when a concept occurs in the meeting, wherein the second time point is later than the first time point, and wherein a time difference between the first time point and the second time point is less than a predetermined time difference threshold;
identify a third time point when the concept occurs in the meeting, wherein the third time point is later than the second time point; and
in response to a time difference between the third time point and the second time point being equal to or greater than the predetermined time difference threshold, determine a meeting segment between the first time point and the second time point to be associated with the concept.

17. The system of claim 16, wherein the processor circuitry is further configured to:
in response to the time difference between the third time point and the second time point being less than the predetermined time difference threshold, determine a meeting segment between the first time point and the third time point to be associated with the concept.

18. The system of claim 12, wherein the processor circuitry is further configured to:
generate coding comments for the program codes based on the one or more meeting segments.

19. The system of claim 12, wherein the processor circuitry is further configured to:
mark the one or more meeting segments as having been outputted for the coding intent; and
in response to a request for reviewing a progress of the program code development, output unmarked meeting segments to assist the review.

20. A computer program product for assisting program code development, the computer program product comprising:
a non-transitory machine-readable medium; and
instructions stored on the non-transitory machine-readable medium, the instructions configured to, when executed by a processor circuitry, cause the processor circuitry to:
obtain multimodal data of a meeting discussing a program code development, wherein the obtaining the multimodal data of the meeting comprises:
recording the meeting to obtain audio data and video streams of the meeting in real time from multi-media devices, and
retrieving the multimodal data of the meeting from a cloud storage maintaining records and contents of past meetings;
extract a plurality of topics and a plurality of concepts from the multimodal data of the meeting, a concept representing an object or an action relevant to a topic discussed during the meeting, and a topic being associated with a set of concepts and a concept being associated with a set of topics, wherein the extracting the plurality of topics and the plurality of concepts comprises:
converting, using a speech-to-text tool, the audio data of the meeting into textual data of the meeting, and performing natural language processing (NLP) on the textual data of the meeting to extract the plurality of topics and the plurality of concepts from the textual data of the meeting;

identify a plurality of meeting segments for the plurality of concepts, wherein a meeting segment represents a segment of the multimodal data of the meeting over a time period during the meeting and a concept occurring in a set of meeting segments, wherein a concept is associated with the set of meeting segments, and wherein a meeting segment is associated with a set of concepts;

determine a coding intent from program codes for the program code development;

align the coding intent to a set of topics;

for a topic of the set of topics, identify, using a filtered topic-to-concept bipartite graph, the set of concepts associated with the topic aligned with the coding intent, wherein the filtered topic-to-concept bipartite graph is generated by:
  mappings using association information between the plurality of topics and the plurality of concepts, and
  processing the mappings between the plurality of topics and the plurality of concepts to generate the filtered topic-to-concept bipartite graph;

for a concept of the set of concepts, identify, using a concept-to-meeting-segment bipartite graph, the set of meeting segments associated with the concept, wherein the concept-to-meeting-segment bipartite graph is generated by:
  determining an association weight between the concept and the meeting segment associated with the concept, and
  creating a concept-to-meeting-segment weighted association which represents the concept-to-meeting-segment bipartite graph between the set of concepts and the set of meeting segments;

for a meeting segment of the set of meeting segments, determine an alignment metric of the meeting segment based on an alignment metric between the coding intent and the topic, an alignment metric between the topic and the concept, and the association weight between the concept and the meeting segment associated with the concept; and output, via a graphical user interface (GUI), one or more meeting segments for the coding intent based on alignment metrics of the one or more meeting segments for the coding intent to a developer who is developing the program codes corresponding to the coding intent in order to facilitate the program code development.

* * * * *